Patented Oct. 13, 1936

2,057,623

UNITED STATES PATENT OFFICE 2,057,623

ANTITOXIN

Stanley D. Beard, Pearl River, N. Y., assignor to Lederle Laboratories, Inc., Pearl River, N. Y., a corporation of Delaware No Drawing. Application December 21, 1932, Serial No. 648,190

6 Claims. (Cl. 167—78)

This invention relates to immunization of living beings, including animals and human beings.

It is the object of this invention to provide immunization of greater effectiveness and much more quickly than has been obtained in the past. It is a further object of the invention to produce antitoxins much more quickly than hitherto, and antitoxins of much greater potency.

In practicing the invention I first provide a material of the toxin type. By this term I include toxins, attenuated toxins, toxin containing vaccines, toxoids, mixtures of the above and other materials of similar character. Materials of this character are intermingled with a repository base of suitable character preferably one which is slowly absorbable by the body fluids. The base should not be soluble to any great degree either in water or in the body fluids in order to prevent too rapid absorption thereof by the body. It should be capable of holding relatively large amounts of the toxin type material without separation. It should be emulsifiable with water for best results. The consistency of the base should be such that at the body temperature it is softened and does not cause hard lumps to be formed upon injection. It should be inert to the toxins and should be non-irritant.

In my experiments I have found that lanolin is an excellent material for the repository base. While for some purposes I prefer to use a refined lanolin I may in some cases prefer to use substitutes for lanolin. The lanolin may be used by itself, or may be diluted with an oil such as, for example, almond oil. I have also used successfully other substances similar to those found in lanolin. Such compositions may be mixtures of oils and waxes with or without emulsifying agents, and for certain uses are satisfactory.

In use I provide a toxin material obtained from any suitable source, preferably concentrated by known methods and intimately mix the same with the repository base. The mixture is then injected into the living being causing certain reactions to take place which at the present time are not fully and definitely understood. Whatever the reactions in the body may be, the result is that production of antitoxin in the body is greatly stimulated so that in a comparatively short time, the antitoxin content of the blood becomes very great. The mixture may be in the ratio of one part toxoid to about two parts lanolin, e. g., I may use a mixture containing 10 cc. of toxoid with 20 grams of lanolin. Not only are stronger antitoxins produced thereby than had heretofore been thought possible, but they are obtained in a much shorter time and with fewer injections than had previously been required to obtain a much weaker antitoxin and in fact, the action by my invention is many times as effective as had hitherto been thought possible. This may be used to produce immunity in human beings by the production of antitoxin in the human body and is equally adapted for the injection of animals and the production of powerful antitoxins therefrom. By this invention there is produced by a single injection in human beings as effective an immunity as that usually obtained by two injections. By a very few injections in animals, an antitoxin is produced of higher potency than had ever before been obtained by old methods, even after many injections over a long period of time.

The invention has been successfully utilized to establish a long lasting immunity against tetanus in animals, particularly in horses with but a single small injection. It has also been successfully used in immunizing horses for the production of diphtheria antitoxin of extremely great potency. The principle involved herein appears suitable for immunization against various diseases and for the production of various antitoxins therefor, such as tetanus, gas gangrene, erysipelas, scarlet fever, dysentery, botulinus antitoxins, antivenoms and almost any other antitoxin type of antibody.

As applied to the immunization of children I have taken a refined and concentrated diphtheria toxoid which was produced as is now known. It was mixed with lanolin or some substitute repository base and .25 cc. of this mixture was injected into children subcutaneously or intramuscularly. A single injection was sufficient to give complete immunization within one month in practically all cases as measured by the well known Schick test. Similar repositories have been made with other materials, as for instance, lanolin repository after mixing with the toxoid was diluted with almond oil. I may also use as a substitute for lanolin other waxy materials or mixtures of materials slowly absorbable in the body fluids and which have a consistency approximating lanolin.

As applied to the practical production of antitoxin commercially from horses, I first injected a horse subcutaneously with a repository of refined and concentrated diphtheria toxoid in lanolin. The result with three single injections was a remarkably rapid production of antitoxin. By far the better results were obtained by the intraperitoneal injection of the same diphtheria toxoid in lanolin into a horse. Two injections, only, 19 days apart were given. Five weeks after the first injection the potency of the antitoxin in the horse's serum was above 3000 units per cubic centimeter. All indications were that the maximum potency had not even been approached. In commercial production of diphtheria antitoxins by old methods a much lower potency was obtained even on extremely long treatment of the horses. For example, the best horse which I have had producing diphtheria antitoxin in an experience of 20 years with hundreds of horses produced serum of about 1500 units of potency, and these horses required many months of treatment to build up the potency to this point. A fair average of the best horses producing antitoxin commercially is between 500 and 1000 units although a few exceptional individuals produce higher.

From the above it will be apparent that my invention has succeeded in producing remarkable results never before attained. Immunity both in animals and in humans is much more quickly established than heretofore. In animals antitoxin has been obtained of a much higher degree than was ever possible following old methods. As applied to the commercial production of antitoxins we are enabled by this method with remarkably few injections to obtain a potency which is many times that previously obtained. This will permit of the usual effective prophylactic and therapeutic doses of antitoxin being administered in a much smaller volume and with the introduction of a much lessened amount of the accompanying protein which, besides lessening the pain and discomfort to the child due to the injection, results in a further reduction in serum reactions due to the protein introduced with the injection.

I am aware that it has been previously proposed to produce antitoxin by providing a mixture of live bacteria in agar and injecting the same subcutaneously in the animal, thereby forming a plaque, which will allow the growth of the bacteria at the body temperature of the horse, the production of toxin thereby, and the diffusion of the toxin into adjacent tissues and the body fluids, whereby antitoxin is produced. The said prior art method has found practical application only as applied to streptococci. There was no great increase in the potency of the resulting antitoxin and no such results as are here obtained were produced there.

Although I have described my invention setting forth specifically the use thereof in immunization of children against diphtheria, it will be apparent from the general nature of the above description that it is intended not to be limited to diphtheria. From work already done it is apparent that the principles here involved are adaptable to the treatment of many other diseases with equal advantages and from such work, it is believed that this invention is applicable to practically the entire field of immunization where antitoxin production is a factor. My invention is not to be limited except by the character of the claims appended hereto.

What I claim is:

1. In a method of producing antitoxin, the step which comprises injecting into a living animal a concentrated toxin material intermingled with a repository base consisting essentially of lanolin whereby the antitoxin is produced in the animal.

2. A method of producing antitoxins which comprises injecting into an animal a toxin material specific to diphtheria intermingled with a repository base consisting essentially of lanolin, allowing the animal to build up an immunity by the production of diphtheria antitoxin, withdrawing blood from said animal and obtaining antitoxin therefrom.

3. An antitoxin material produced by the process of claim 2.

4. An antitoxic serum specific to diphtheria produced in accordance with the process of claim 2, said serum having a potency of over 1500 units per cubic centimeter before concentration.

5. In a method of producing antitoxin, the step which comprises injecting intraperitoneally into a living animal a concentrated toxin material intermingled with a repository base consisting essentially of lanolin whereby the antitoxin is produced in the animal.

6. A method of producing antitoxins which comprises injecting intraperitoneally into an animal a toxin material specific to diphtheria intermingled with a repository base consisting essentially of lanolin, allowing the animal to build up an immunity by the production of diphtheria antitoxin, withdrawing blood from said animal and obtaining antitoxin therefrom.

STANLEY D. BEARD.

CERTIFICATE OF CORRECTION.

Patent No. 2,057,623.                                              October 13, 1936.

STANLEY D. BEARD.

It is hereby certified that error appears in the printed specification of the above numbered patent requiring correction as follows: Page 1, first column, lines 50, 51, 52 and 53, strike out the sentence "The mixture may be in the ratio of one part toxoid to about two parts lanolin, e. g., I may use a mixture containing 10 cc. of toxoid with 20 grams of lanolin." and insert the same before "The" second column, line 51; page 2, second column, line 31, claim 3, for the claim reference numeral "2" read 1; and that the said Letters Patent should be read with these corrections therein that the same may conform to the record of the case in the Patent Office.

Signed and sealed this 2nd day of February, A. D. 1937.

(Seal)                                                                         Leslie Frazer
                                                                           Acting Commissioner of Patents